April 18, 1950        A. G. SCISM        2,504,595
PORTABLE MACHINE TOOL
Filed March 14, 1947
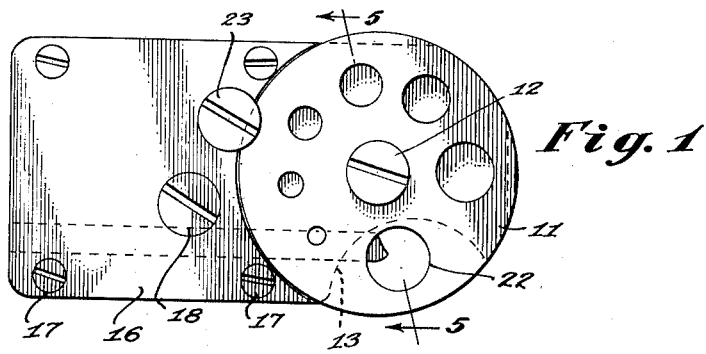
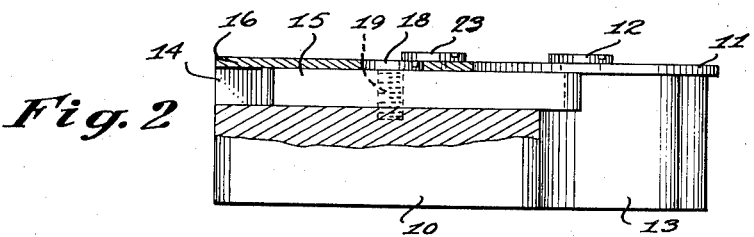
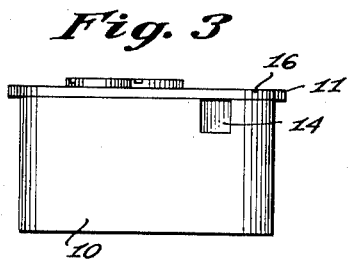 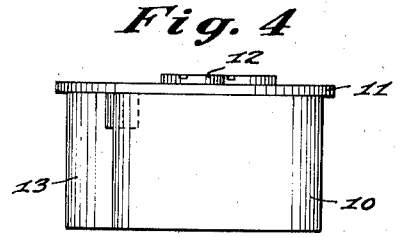
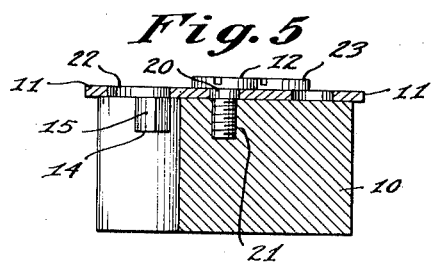
INVENTOR.
ARTHUR G. SCISM
BY
ATTORNEYS Patented Apr. 18, 1950

2,504,595

UNITED STATES PATENT OFFICE 2,504,595

PORTABLE MACHINE TOOL

Arthur G. Scism, Mount Airy, N. C.

Application March 14, 1947, Serial No. 734,611

1 Claim. (Cl. 82—35)

This invention relates to comparatively small machine tools or attachments that may be used in combination with a drill press or the like for performing operations normally accomplished on a lathe, and in particular a comparatively small tool holding block or chuck that may be clamped to the bed plate of a drill press or the like wherein a cutting tool therein may operate on a bar suspended from and rotated by a chuck of a drill press with the bar positioned in a plate on the device having an opening corresponding with the size of the bar.

The purpose of this invention is to provide means for mounting a cutting tool on a drill press or the like wherein a bar or other material suspended in and actuated by a chuck of the drill press may be turned or cut by the tool.

In small shops such as in textile mills and in the average home shop lathes are not provided and substantially all cutting is performed on drill presses and the like. Whereas drill presses are satisfactory for most work it is difficult to hold cutting tools, or work for turning, in the chucks thereof. With this thought in mind this invention contemplates a comparatively small tool holder in combination with a work guide having a plurality of openings of different sizes wherein the tool holder may be clamped on the bed plate of a drill press and work to be turned or cut thereby may be suspended in the chuck of the drill and held by the guide plate of the device.

The object of this invention is to provide means for mounting a cutting tool on the bed plate of a drill press and means in combination with the cutting tool for holding work to be turned or cut in operative relation thereto.

Another object of the invention is to provide a device for holding a cutting tool on bed plates of drill presses and the like with a work-holding guide in combination therewith wherein the guide may be set to hold work of different sizes.

A further object of the invention is to provide a cutting tool holding device with work guiding means associated therewith that may be attached to bed plates of drill presses, which is of a simple and economical construction.

With these and other objects in view the invention embodies a substantially rectangular shaped block having a tool holding slot therein with a rotatably mounted guide having a plurality of openings of different sizes therethrough and clamping means for the tool, block, and guide.

Other features and advantages of the invention will appear from the following description taken in connection with the drawings wherein:

Figure 1 is a view showing the upper surface of the chuck.

Figure 2 is a view showing a side elevation of the device with parts broken away showing the tool holding slot therein.

Figure 3 is a view showing a rear elevation of the device.

Figure 4 is a view showing a front elevation looking toward the cutting end of the chuck.

Figure 5 is a cross section through the cutting end of the chuck taken on line 5—5 of Figure 1.

Referring now to the drawings wherein like reference characters indicate corresponding parts, the portable machine tool holding chuck of this invention includes a block 10 and a work holding guide 11 pivotally mounted on the block by a screw 12.

In the design shown the block 10 is of rectangular shape with a recess 13 extending vertically through the cutting end and a longitudinally extending slot 14 provided in the upper surface for holding a cutting tool 15. The upper surface is provided with a cover plate 16 secured to the block by screws 17 and a tool 15, positioned in the slot 14 is held rigid for cutting by a clamp screw 18 extending through the plate 16 and threaded in the block 10 as indicated by the dotted lines 19 shown in Figure 2.

The guide plate 11 is pivotally mounted on a shoulder 20 of the screw 12 which is also threaded in the block 10 as shown at the point 21 in Figure 5, and this plate which is provided with a plurality of work holding openings 22 is rigidly held in operative position by a clamp screw 23 that is also threaded into the block 10. The openings 22 may be provided to slidably hold a rod or bar one-half inch in diameter, three-eighths of an inch in diameter, one-quarter of an inch in diameter, or substantially of any size and with the bar clamped in a chuck of a drill press or the like and with the tool positioned on the bed plate of the press below the chuck the bar may enter the opening 22 as it is brought downward wherein the end thereof will be engaged by the cutting tool 15 so that the bar may be cut or turned down thereby.

The portable machine tool of this invention therefore includes a block or base in which a cutting tool may be clamped and a guide plate for holding the end of a rod or other work in relation to the cutting tool wherein openings in the guide plate provide bearings or bearing surfaces supporting the work as it is being turned down or cut by the cutting tool.

The block or tool and also the guide plate 11 may be of any size and the slot in the base may be provided to hold a cutting tool of any size. The block or base may be held by hand or may be clamped to the bed plate of the drill press as may be desired.

It will be understood that modifications may be made in the design and arrangement of the parts without departing from the spirit of the invention.

What is claimed is:

In a portable machine tool adapted for positioning on a bed plate of a drill press and the like, and comprising a base, a disk having a plurality of openings of different sizes therethrough providing a work guide, and pivot means rotatably mounting the disk on the base, the features which include a substantially rectangular block forming the base and having a longitudinally disposed slot directed toward one of the holes in the disk for mounting a cutting tool upon said block, the latter having an arcuate cutout portion in the edge thereof forming a clearance for the tool and for a workpiece extending through the hole in said disk adjacent to said tool, a plate secured to said block substantially in the same plane with said disk having an opening adjacent to and partly overlapping the cutting tool when located in said slot, the block having a threaded bore concentric with the opening in the plate and a second threaded bore adjacent to the edge of said disk, a headed screw in the first threaded bore having the head thereof engaging upon and retaining the tool in said slot independently of said plate, a second headed screw in the second threaded hole having the head thereof engaging upon the edge of said disk to retain it in attained rotated position, and a concavely arcuate edge forming the forward end of said plate terminating adjacent to and conforming to the curvature of the periphery of said disk.

ARTHUR G. SCISM.

REFERENCES CITED

The following references are of record in the file of this patent:

UNITED STATES PATENTS

| Number | Name | Date |
|---|---|---|
| 68,064 | Gifford | Aug. 27, 1867 |
| 1,056,429 | Maier | Mar. 18, 1913 |
| 2,114,926 | Kneff | Apr. 19, 1938 |